United States Patent [19]

Pencis et al.

[11] Patent Number: 5,793,941
[45] Date of Patent: Aug. 11, 1998

[54] ON-CHIP PRIMARY CACHE TESTING CIRCUIT AND TEST METHOD

[75] Inventors: Jennifer B. Pencis; Atish Ghosh, both of Austin, Tex.

[73] Assignee: Advanced Micro Devices, Inc., Sunnyvale, Calif.

[21] Appl. No.: 566,876

[22] Filed: Dec. 4, 1995

[51] Int. Cl.[6] ................................................ G06F 11/34
[52] U.S. Cl. ................................ 395/182.03; 371/21.1; 395/182.04
[58] Field of Search .................... 371/21.1; 365/200, 365/201; 395/182.03, 185.02, 308, 455, 449, 182.04

[56] References Cited

U.S. PATENT DOCUMENTS

| | | | |
|---|---|---|---|
| 3,577,185 | 5/1971 | Belady | 340/147.5 |
| 5,025,366 | 6/1991 | Baror | 364/200 |
| 5,325,504 | 6/1994 | Tipley et al. | 395/455 |
| 5,345,576 | 9/1994 | Lee et al. | 395/308 |
| 5,422,837 | 6/1995 | Boothroyd et al. | 395/800 |
| 5,537,571 | 7/1996 | Deville | 395/460 |
| 5,539,892 | 7/1996 | Reininger et al. | 395/417 |
| 5,568,632 | 10/1996 | Nelson | 395/460 |
| 5,594,886 | 1/1997 | Smith et al. | 395/463 |

OTHER PUBLICATIONS

Handy, Jim, "*Cache Memory Book*", Academic Press, Inc. 1993.

*Primary Examiner*—Phung M. Chung
*Attorney, Agent, or Firm*—Skjerven, Morrill, MacPherson, Franklin & Friel LLP; Ken J. Koestner

[57] ABSTRACT

A primary cache test system is supplied using a secondary cache that closely matches specifications of the primary cache. Coherency is maintained between the primary and secondary caches using inclusion by a write-once protocol. The test system includes software which suspends cache operations on receipt of an error signal from a secondary cache controller or by periodically pausing cache operations for cache operation monitoring. During suspension of cache operations, the software verifies the states of the primary cache against the states and data within the secondary cache. Signals on cache hit and hit-modified pins that are available on the microprocessor integrated circuit are monitored to detect various error conditions. Error analysis includes detection of invalid hits to the primary cache, incorrectly modified lines in the primary cache and misses to the primary cache that should be hits.

20 Claims, 6 Drawing Sheets

ON-CHIP PRIMARY CACHE TESTING CIRCUIT AND TEST METHOD

BACKGROUND OF THE INVENTION

1. Field of the Invention

This invention relates to a circuit for testing a microprocessor. More specifically, this invention relates to a circuit for testing an on-chip primary cache on a single-chip microprocessor.

2. Description of the Relevant Art

Various microprocessor architectures, such as later generations of x86 processor architectures, employ a memory hierarchy that includes a primary or level 1 (L1) cache and a secondary or level 2 cache (L2) cache. The L1 and L2 caches are cascaded between the processor and a main memory. The primary (L1) cache is integrated into a single VLSI microprocessor chip and connects directly to the processor and is accessed for every memory read and write cycle. The secondary (L2) cache is typically constructed outside the VLSI microprocessor chip and is connected between the L1 cache and main memory. A system uses two cascaded caches to operate faster by reducing the access time of the main memory during on-chip cache miss cycles. This is done by employing a larger but slower cache outside of the chip and using this cache to accelerate the apparent access time of the main memory during an on-chip cache miss cycle. In addition to accelerating system speed, utilization of multiple caches typically is used to improve die size on the processor chip.

VLSI microprocessor circuits are highly complex with many modern microprocessors containing millions of transistors. Testing of these complex circuits is difficult due to the uncertainty of accurately isolating the source of an error. This uncertainty is heightened in single-chip microprocessor circuits which utilize an internal cache memory. When a microprocessor is working from instructions and data that are stored in the internal cache memory and an error occurs, there are no external indications of error or external data that can be accessed to supply information for analysis of the error. For example, neither indications of the data accesses attempted, indications of the actual data received by the cache nor indications of correctness of the data are available for analysis when the microprocessor fails.

The difficulties in testing and debugging an on-chip cache are accentuated by the complex structure of many caches. For example, one embodiment of an on-chip cache is a split internal 4-way cache, in which an instruction cache section is split apart from a data cache section. This structure is essentially an 8-way cache structure. Within the cache, a variety of decoding, predecoding and other operations take place that can result in operating errors. As a result of an error, incorrect data may be placed at a cache memory location or data may be placed incorrectly in the cache. Such errors are substantially impossible to analyze due to the lack of information available to circuits internal to a VLSI circuit.

What is desired is an apparatus and technique for tracking information in the internal cache memory at all times.

SUMMARY OF THE INVENTION

In accordance with the present invention, a primary cache test system is supplied using a secondary cache that closely matches specifications of the primary cache. Coherency is maintained between the primary and secondary caches using inclusion by a write-once protocol. The test system includes software which suspends cache operations on receipt of an error signal from a secondary cache controller or by periodically pausing cache operations for cache operation monitoring. During suspension of cache operations, the software verifies the states of the primary cache against the states and data within the secondary cache. Signals on cache hit and hit-modified pins that are available on the microprocessor integrated circuit are monitored to detect various error conditions. Error analysis includes detection of invalid hits to the primary cache, incorrectly modified lines in the primary cache and misses to the primary cache that should be hits.

In one embodiment, both the primary and secondary caches are implemented as a split data and instruction cache which is 4-way set associative, look-aside caches. The data cache section has an 8K byte capacity. The instruction cache section has a 16K byte capacity.

Several advantages are achieved by the disclosed secondary cache. The secondary cache advantageously tracks operations of a primary cache very closely so that the primary cache is fully and easily testable.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The following sets forth a detailed description of the best contemplated mode for carrying out the invention. The description is intended to be illustrative of the invention and should not be taken to be limiting.

Figure 1:
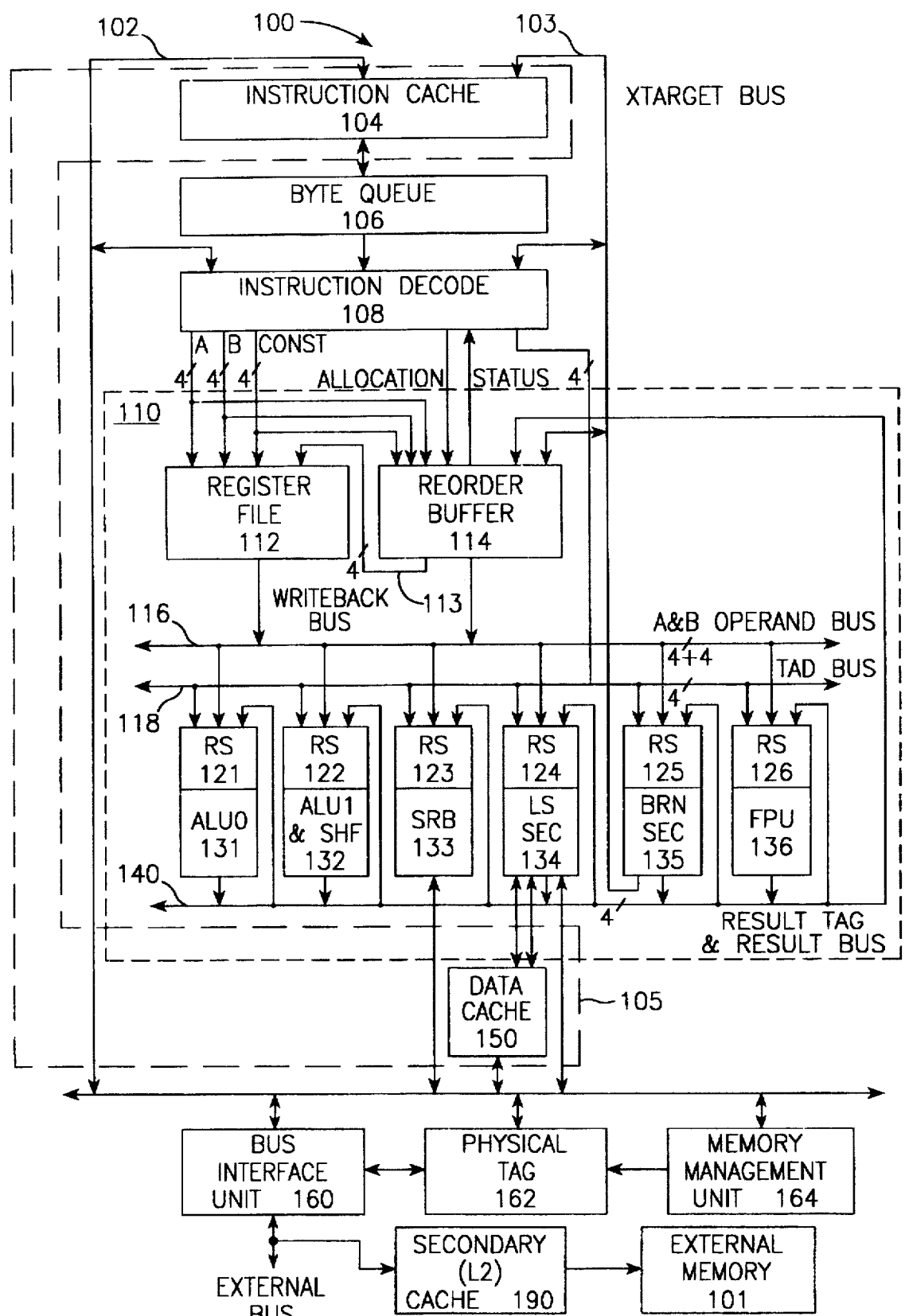
FIG. 1 is a block diagram of a microprocessor connected to a secondary cache in accordance the present invention.

Referring to FIG. 1, a superscalar X86 microprocessor 100 executes the X86 instruction set. Microprocessor 100 is connected to physically addressed external memory 101 via a 486 XL bus or other conventional microprocessor bus. Microprocessor 100 includes a primary (L1) cache 105 incorporating an instruction cache 104 and a data cache 150. The instruction cache 104 is connected to byte queue 106 which is connected to instruction decoder 108. Instruction decoder 108 is connected to RISC core of the microprocessor 100. RISC core includes register file 112 and reorder buffer 114 as well as a variety of functional units such as shift unit 130 (SHF), arithmetic logic units 131, 132 (ALU0 and ALU1), special register block 133 (SRB), load/store unit 134 (LSSEC), branch section 135 (BRNSEC), and floating point unit 136 (FPU). The microprocessor 100 is a single VLSI chip circuit. In a circuit that is connected to the microprocessor circuit VLSI chip, a secondary cache 190 is supplied which is connected to the primary cache 105 of the microprocessor chip.

The L1 cache 105 is organized as a split data and instruction cache including an 8K byte 4-way set-associative data cache 150 and a 16K byte 4-way set-associative instruction cache 104. Both the data cache 150 and the instruction cache 104 are virtually addressed and virtually tagged to avoid translation of addresses before a cache access. A single set of physical tags is shared by both the instruction cache 104 and the data cache 150. When a change is made to the virtual-to-physical mapping of the L1 cache 105, the virtual cache tags are invalidated.

The instruction cache is organized as 1024 blocks of 16 predecoded X86 instruction bytes. The L1 cache 105 has an address tag array that is dual-ported and contains 1024 entries, each including a 20-bit linear address tag, a single valid bit designating valid status for the entire block and 16 individual byte-valid bits, one for each of the sixteen corresponding instruction bytes within the instruction store array.

The data cache 150 is dual-ported and connected to dual load/store units 134 to allow two accesses to the 8K byte data cache 150 to be performed in a single clock cycle so long as no two accesses are to the same bank. Dual load/store units 134 are implemented to address a high incidence of load and store operations that typically result due to the small number of registers provided in an x86 architecture. Ports (not shown) of the data cache 150 support one or two load operations or, alternatively, one or two store operations.

The data cache 150 includes four banks and has two access ports, one for each load/store unit 134. Data accesses to different banks proceed in parallel although two accesses to the same cache bank occur in the same cycle if both accesses are applied to the same cache line.

Data cache 150 is connected to load/store functional unit 134 of the RISC core and with intraprocessor address and data (IAD) bus 102. Instruction cache 104 is also connected with IAD bus 102. The instruction cache 104 and data cache 150, in combination, form the primary (L1) cache 105 on the microprocessor chip. The primary (L1) cache 105 is connected to the secondary (L2) cache 190 which is not fabricated on the VLSI microprocessor chip. Instruction cache 104 and data cache 150 are both linearly addressable caches. Instruction cache 104 and data cache 150 are physically separate, however, both caches are organized using the same architecture. Microprocessor 100 also includes a physical tag circuit 162. Physical tag circuit 162 interacts with both instruction cache 104 and data cache 150 via the IAD bus.

RISC core 110 includes A and B operand buses 116, type and dispatch (TAD) bus 118 and result bus 140 which are connected to the functional units as well as displacement and instruction, load store (INLS) bus 119 which is connected between instruction decoder 108 and load/store unit 134. A and B operand buses 116 are also connected to register file 112 and reorder buffer 114. TAD bus 118 is also connected to instruction decoder 108. Result bus 140 is also connected to reorder buffer 114. Additionally, branch section 135 is connected to reorder buffer 114, instruction decoder 108 and instruction cache 104 via Xtarget bus 103. A and B operand buses 116 includes four parallel 41-bit wide A operand buses and four parallel 41-bit wide B operand buses as well as four parallel 12-bit wide A tag buses, four parallel 12-bit wide B tag buses, a 12-bit wide A tag valid bus a 12-bit wide B tag valid bus, four 4-bit wide destination tag buses and four 8-bit wide opcode buses. Type and dispatch bus 118 includes four 3-bit wide type code buses and one 4-bit wide dispatch buses. Displacement and INLS bus 119 includes two 32-bit wide displacement buses and two 8-bit wide INLS buses.

Microprocessor 100 also includes memory management unit (MMU) 164 and bus interface unit 160 (BIU). TLB 164 is connected with the IAD bus and physical translation circuit 162. Bus interface unit 160 is connected to physical translation circuit 162, data cache 150 and IAD bus 102 as well as an external microprocessor bus such as the 486 XL bus.

Microprocessor 100 executes computer programs which include sequences of instructions. Computer programs are typically stored on a hard disk, floppy disk or other non-volatile storage media, such as a BIOS ROM, which are located in the computer system. When the program is run, the program is loaded from the storage media into main memory 101. Once the instructions of the program and associated data are in main memory 101, individual instructions are prepared for execution and ultimately executed by microprocessor 100.

After being stored in main memory 101, the instructions are passed via bus interface unit 160 to instruction cache 104, where the instructions are temporarily held. The x86 instructions are provided by instruction cache 104 to instruction decoder 108 using a fetch program counter value which is generated by instruction cache 104.

Instruction decoder 108 examines the instructions and determines the appropriate action to take. For example, decoder 108 may determine whether a particular instruction is a PUSH, POP, LOAD, STORE, AND, OR, EX OR, ADD, SUB, NOP, JUMP, JUMP on condition (BRANCH) or other instruction. Depending on which particular instruction that decoder 108 determines is present, the corresponding RISC operation (ROP) or RISC operations (ROPs) are dispatched to the appropriate functional unit of RISC core 110 and a Decode PC valve corresponding to each ROP or set of ROPs is generated. The decode PC valve is generated asynchronously of the fetch PC valve.

The instructions typically include multiple fields in the following format: OP CODE, OPERAND A, OPERAND B and DESTINATION. For example, the instruction ADD A, B, C means add the contents of register A to the contents of register B and place the result in register C. LOAD and STORE operations use a slightly different format. For example, the instruction LOAD A, B, C means place data retrieved from an address on the result bus, where A, B and C represent address components which are located on the A operand bus, the B operand bus and the displacement bus, these address components are combined to provide a logical address which is combined with a segment base to provide the linear address from which the data is retrieved. Also for example, the instruction STORE A, B, C means store data in a location pointed to by an address, where A is the store data located on the A operand bus and B and C represent address components which are located on the B operand bus and the displacement bus, these address components are combined to form a logical address which is combined with a segment base to provide the linear address to which the data is stored.

The OP CODEs are provided from instruction decoder 108 to the functional units of RISC core 110 via opcode bus. Not only must the OP CODE for a particular instruction be provided to the appropriate functional unit, but also the designated OPERANDs for the instruction must be retrieved and sent to the functional unit. If the value of a particular operand has not yet been calculated, then that value must be first calculated and provided to the functional unit before the functional unit can execute the instruction. For example, if a current instruction is dependent on a prior instruction, the result of the prior instruction must be determined before the current instruction can be executed. This situation is referred to as a dependency.

The operands which are needed for a particular instruction to be executed by a functional unit are provided by either register file 112, reorder buffer 114 to the operand bus or forwarded from a functional unit via result bus 140. The operand bus conveys the operands to the appropriate functional units. Once a functional unit receives the OP CODE, OPERAND A, and OPERAND B, the functional unit executes the instruction and places the result on a result bus 140, which is connected to the outputs of all of the functional units and to reorder buffer 114.

Reorder buffer 114 is managed as a first in first out (FIFO) device. When an instruction is decoded by instruction decoder 108, a corresponding entry is allocated in reorder buffer 114. The result value computed by the instruction is then written into the allocated entry when the execution of the instruction is completed. The result value is subsequently written into register file 112 and the instruction retired if there are no exceptions associated with the instruction and if no speculative branch is pending which affects the instruction. When the instruction is retired, its associated execute program counter value is also stored in a program counter register in register file 112. If the instruction is not complete when its associated entry reaches the head of the reorder buffer 114, the advancement of reorder buffer 114 is halted until the instruction is completed. Additional entries, however, can continue to be allocated.

Each functional unit includes respective reservation station circuits (RS) 120–126 for storing OP CODEs from instructions which are not yet complete because operands for that instruction are not yet available to the functional unit. Each reservation station circuit stores the instruction's OP CODE together with tags which reserve places for the missing operands that will arrive at the reservation station circuit later. This technique enhances performance by permitting microprocessor 100 to continue executing other instructions while the pending instruction is being assembled with its operands at the reservation station.

Microprocessor 100 affords out of order issue by isolating decoder 108 from the functional units of RISC core 110. More specifically, reorder buffer 114 and the reservation stations of the functional units effectively establish a distributed instruction window. Accordingly, decoder 108 can continue to decode instructions even if the instructions can not be immediately executed. The instruction window acts as a pool of instructions from which the functional units draw as they continue to go forward and execute instructions. The instruction window thus provides microprocessor 100 with a look ahead capability. When dependencies are cleared and as operands become available, more instructions in the window are executed by the functional units and the decoder continues to fill the window with yet more decoded instructions.

Microprocessor 100 uses branch section 135 of the RISC core to enhance its performance. Because when a branch occurs, the next instruction depends upon the result of the branch, branches in the instruction stream of a program hinder the capability of the microprocessor to fetch instructions. Branch section 135 determines whether branches should be taken. Additionally, instruction cache 104 includes a branch target buffer to keep a running history of the outcomes of prior branches. Based on this history, a decision is made during a particular fetched branch to determine which branch the fetched branch instruction will take. If there is an exception or branch misprediction based upon the determination of branch section 135, then the contents of reorder buffer 114 allocated subsequent to the mispredicted branch instruction are discarded.

Figure 2:
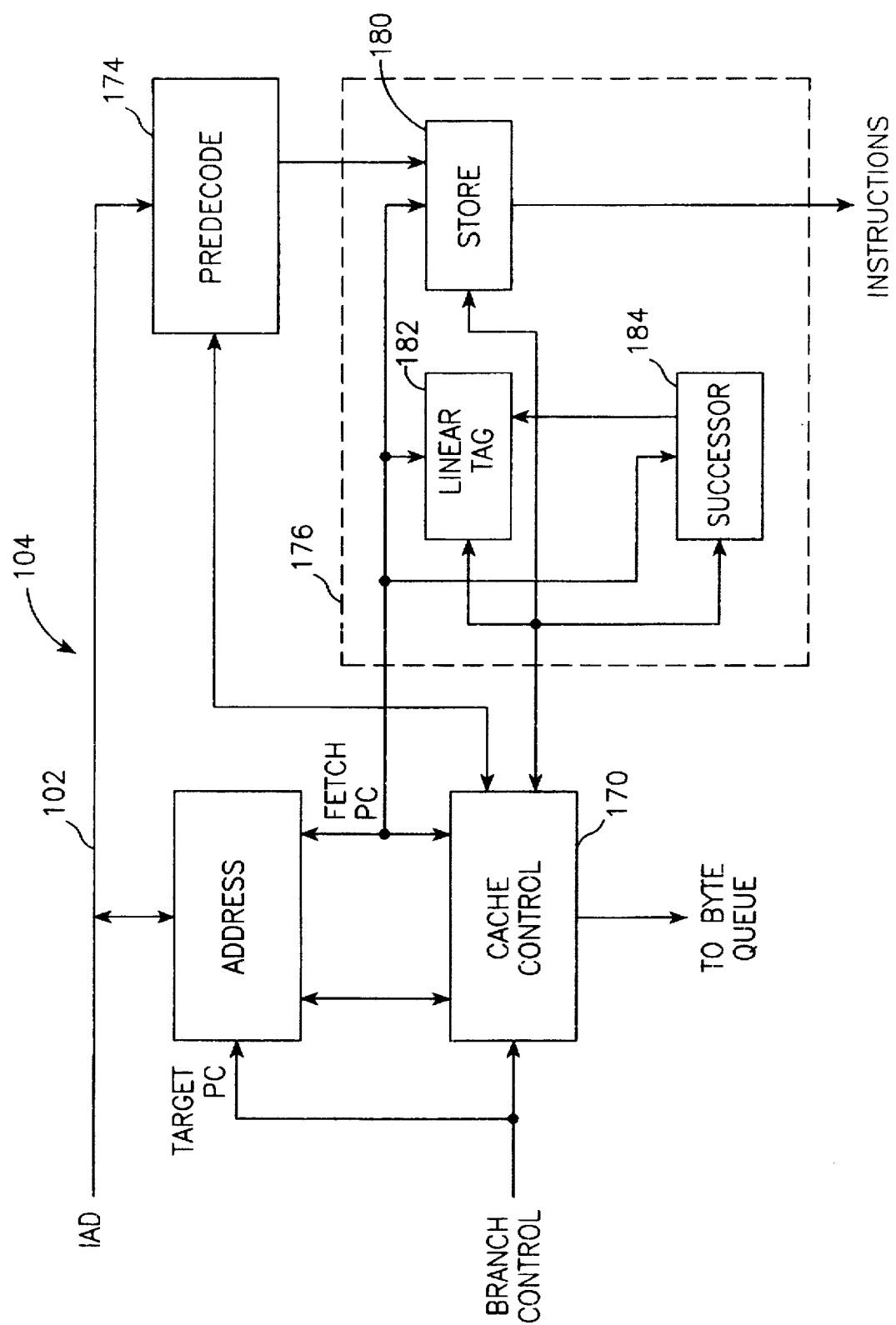
FIG. 2 is a block diagram of a linearly addressed instruction cache in accordance with the present invention.

FIG. 2 shows a block diagram of instruction cache 104. Instruction cache 104 is a linearly addressed 16 Kbyte 4-way set associative cache. Each set includes 256 entries; each entry includes a sixteen byte instruction block which defines the cache line size, a linear address tag and next predicted executed branch information. Cache fills are performed in 32-byte bursts, accordingly a 32-byte burst applied to the data cache 150 includes 16 bytes that are applied directly to the data cache, in combination with 16 bytes that are applied to a 16-byte buffer (not shown). A 16-byte cache line is implemented to improve branch prediction efficiency and yield a higher hit rate. The main memory 101 uses a memory controller that supports burst read transfer operations.

Instruction cache 104 includes cache controller 170, address circuit 172, predecode circuit 174 and cache array 176. Cache controller 170 provides control signals to orchestrate the various operations of instruction cache 104. Address circuit 172 generates a linear fetch program counter (FETCH PC) based upon a logical target program counter (TARGET PC) which is received from branch section 135 or a linear tag from linear tag array 182 and corresponding successor information from successor array 184; address circuit 172 also provides address generation and X86 protection checking associated with pre-fetching instructions from external memory. Address circuit 172 functions as a translation circuit for translating between logical addresses and linear addresses. Predecode circuit 174 receives pre-fetched x86 instruction bytes via IAD bus 102, assigns predecode bits for each x86 instruction byte and writes the predecoded x86 instruction bytes into cache array 176. Cache array 176 stores instructions received from predecode circuit 174 and provides these instructions to byte queue 106 when addressed by the linear FETCH PC signal.

Cache array 176 is organized into three main arrays, instruction cache store array 180, linear tag array 182 and successor array 184. Instruction cache store array 180 stores the 16 byte instructions. Linear tag array 182 stores the linear address tags corresponding to the instructions. Successor array 184 stores predicted branch information, which is used to support branch prediction, corresponding to the instructions. Each of these arrays is addressed by the linear FETCH PC address which is provided by address circuit 172.

Figure 3:
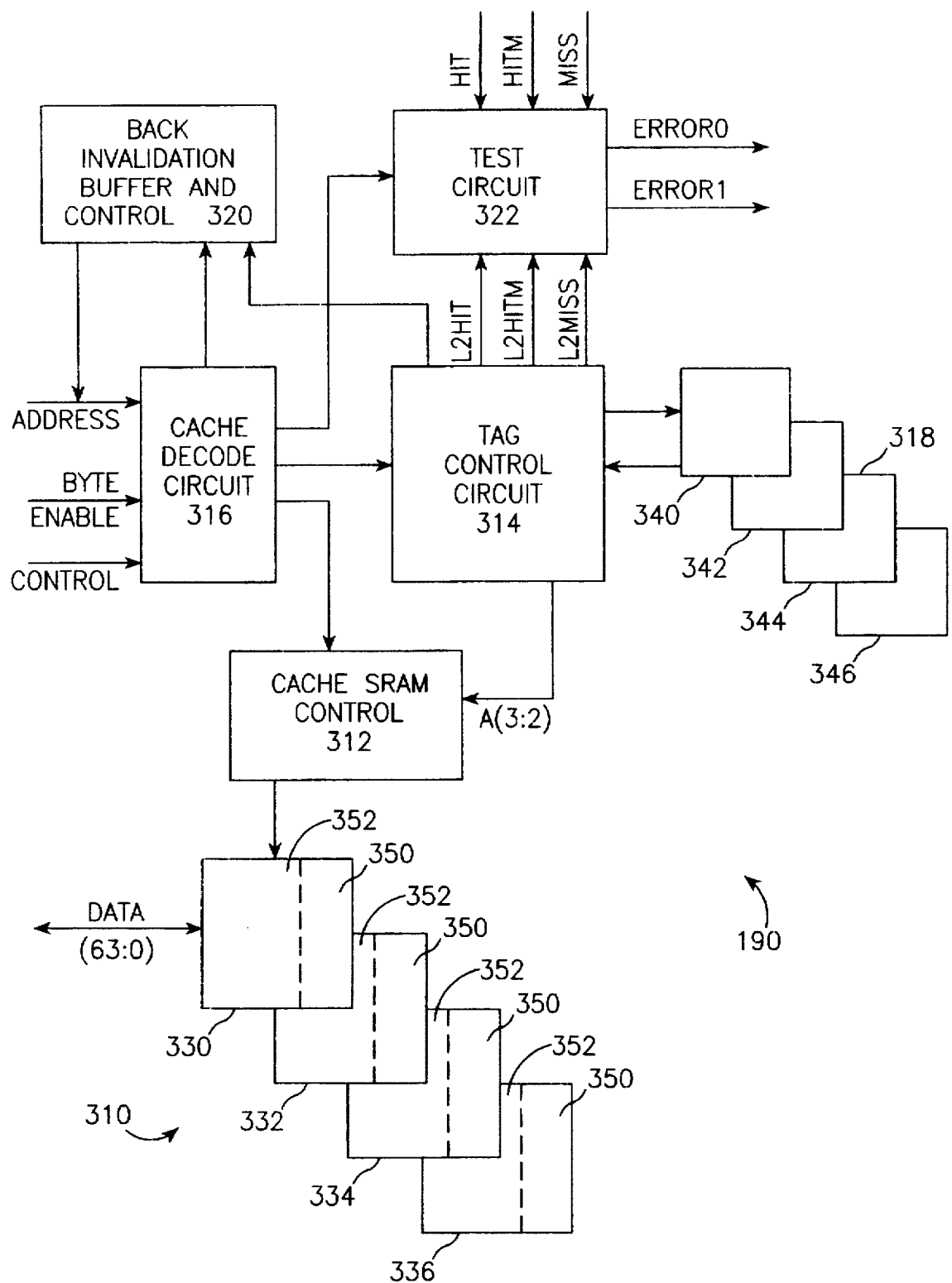
FIG. 3 is a block diagram which illustrates the functional and structural blocks of a secondary cache in accordance with the present invention.

Referring to FIG. 3, the secondary (L2) cache 190 includes a static random access memory (SRAM) data and code memory 310, a cache SRAM control circuit 312, a tag control circuit 314, a cache decode circuit 316, a cache tag memory 318, a back invalidation buffer and control circuit 320 and a test circuit 322. Like the L1 cache 105, the L2 cache 190 is organized as a split data and instruction cache including an 8K byte 4-way set-associative data cache 350 and a 16K byte 4-way set-associative instruction cache 352. The line size of the L2 cache 190 is 16 bytes, matching the line size of the L1 cache 105. Both the L1 cache 105 and L2 cache 190 maintain coherency line by line through snooping, inclusion of contents of the L1 cache 105 into L2 cache 190 storage. L1 cache 105 invalidates are limited through usage of inclusion. According to the inclusion method, the L2 cache 190 directory is used to prescreen invalidation cycles before the cycles are passed to the smaller L1 cache. Accordingly, the contents of the L1 cache are always a subset of the contents of the L2 cache.

Characteristics of the L1 cache 105 greatly influence the operations of the L2 cache 190. For example, the 8K byte 4-way set-associative data cache 350 and a 16K byte 4-way set-associative instruction cache 352 greatly reduce the number of external read cycles seen by the L2 cache 190 and the main memory 101. Accordingly, the processor external bus cycles are more likely to be write cycles than read cycles.

The L2 cache 190 is a split, 4-way set associative look-aside cache. The L2 cache 190 operates under the control of the processor. The L2 cache 190 sets a read condition as a default condition for the next processor cycle. The cycle therefore begins by enabling data RAM output signals onto the data bus. These RAM output signals are disabled under two conditions. First, when the processor W/R# output signal is high, indicating a requested write cycle. Second, during a read cycle after the cache-tag RAM detects a miss or a cycle to a noncacheable address. In the case of a cache hit, the cache-tag RAM and the tag control circuit 314 signify that the cache data is ready using a burst ready input signal so that the processor can continue the write operation. In the case of a cache miss, the processor is stalled and the cache data RAM is disabled from placing data onto the data bus. If the L2 cache 190 contains a valid copy of data or code requested by the processor during a processor read cycle, then the L2 cache 190 allows the processor to perform at the speed of the L2 cache 190. If the L2 cache 190 does not contain a copy of the data or code, then the L2 cache 190 initiates a read cycle of the main memory. The L2 cache 190 then copies the data or code supplied by the main memory and allows the processor to continue execution. Data or code accessed by the processor is routed by the cache SRAM control circuit 312 from the SRAM data and code memory 310 for a cache hit and otherwise from the main memory in the case of a cache miss. Accordingly, the L2 cache 190 intercepts input and output signals of the processor and determine whether these signals are to be applied to the main memory or retained local to the L2 cache 190. For a look-aside cache, the address designated by the processor propagates through the address buffers to the bus at the beginning of all cycles, whether the cycle is a read hit or a read miss cycle. A look-aside cache strategy allows a cache to be removed or inserted into a computer system with no effects other than performance. Main memory transactions are initiated before a cache hit or miss is detected and are aborted if a cache hit occurs. The look-aside L2 cache 190 initiates a main memory access synchronously with the SRAM data and code memory 310 access, rather than waiting for a cache miss before requesting a main memory access. In this manner, the main memory access time is reduced in the event of a cache miss.

A read miss cycle occurs when the contents of the cache tag memory 318 do not match the address directed by the processor. In this case, L2 cache 190 output signals to the data bus DATA(63:0) are terminated and data from the main memory is allowed to be transferred to the processor.

In a write operation, information is written to the L2 cache 190 for immediate or subsequent modification of the main memory. The L2 cache 190 implements a write-once protocol in which the processor must write to a main memory location once before the processor can maintain exclusive use of that location. During this write cycle, the address of the location is invalidated in all other caches. This exclusive use is terminated when another processor attempts to read that location from main memory. Whether the write to main memory is immediate or subsequent is determined by an implemented write policy. A write-through write policy involves writing data from the processor to both the cache and main memory simultaneously to assure coherency. In a copy-back write policy, data written into cache by the processor is not written into main memory until a data line in cache is to be replaced or until the data line is requested by another bus-mastering device. A line is the smallest division of a cache memory that is labeled using a distinct tag.

A data transfer cycle is terminated by an external assertion of either the ready RDY# or burst ready BRDY# input signals to the processor. Either or both of these signals are used to signify the presence of valid data and the end of the transfer cycle. The absence of either the ready RDY# or burst ready BRDY# input signal causes the processor to enter a WAIT state until the rising edge where one of these signals is sampled active.

The SRAM data and code memory 310 is a small and fast memory for storing replicas of instructions and data that, if accessed directly from a main memory, would generally be accessed more slowly. The SRAM data and code memory 310 is connected to receive control signals from the cache SRAM control circuit 312 and is connected to the data bus DATA(63:0) to form a data path for transferring data and code among the L2 cache 190, the L1 cache 105 and the main memory 101. The SRAM data and code memory 310 is readable in the manner of a block of main memory at a predetermined main memory address or as an I/O index and data register. The readable nature of memory in the L2 cache 190 allows test software to be written which compares information in the SRAM data and instruction memory 310, including states of a line of cache memory, to information held in the L1 cache 105. The L1 cache 105 similarly allows data and instruction memory to be accessed through software calls to special registers and a data port to read out data in the tag and data arrays of the L1 cache 105 to accommodate this comparison. An example of a software routine for accessing data and instruction memory is shown in the flow chart of FIG. 5. SRAM data and code memory 310 has 64K sets with four 16-byte ways (also called banks) per set. Each of the four ways are substantially identical. The L2 cache 190 is a 4-way set-associative cache that uses four cache data RAM ways 330, 332, 334 and 336 in the SRAM data and code memory 310.

The cache SRAM control circuit 312 implements a control algorithm which controls transfer of data and code among the SRAM data and code memory 310, the L1 cache 105 and the main memory 101 and further controls transfer of addresses among the cache tag memory 318, the L1 cache 105 and the main memory 111. The cache SRAM control circuit 312 implements the cache strategy of the L2 cache 190 and determines timing for reading to and from the SRAM data and code memory 310 and the cache tag memory 318.

The tag control circuit 314 determines cache status and initiates control of the cache in response to the cache status. In particular, tag control circuit 314 determines whether a cache hit or miss cycle is occurring and, for a cache hit cycle, whether the hit occurs on a modified cache line. In response to this determination, the tag control circuit 314 sets signals on the L2HIT#, L2HITM# and MISS lines. The tag control circuit 314 applies control lines to the cache SRAM control circuit 312 that select the designated way upon which the cache access is directed. The tag control circuit 314 initiates timing cycles, generates write enable signals, tag select signals and chip enable signals, controls transmission of these signals to the SRAM data and code memory 310 and applies the tag portion of the address to the cache tag memory 318. The tag control circuit 314 implements a line replacement algorithm. Furthermore, the tag control circuit 314 also determines which line is to be replaced using a designated replacement algorithm.

During a snoop hit cycle, a main memory bus transaction occurs to an address that is replicated in the cache. An extended address is applied to the tag control circuit 314 to determine whether the address is presently contained in the L2 cache 190 and, if so, to determine whether the addressed data is valid. If no valid line is contained in the cache tag memory 318, the tag control circuit 314 generates a signal on the MISS# line. If a modified line is contained in the cache tag memory 318, the tag control circuit 314 generates a signal on the HITM# line. If a valid line, which is not modified, is contained in the cache tag memory 318, the tag control circuit 314 generates a signal on the HIT# line. These signals are analyzed to determine whether an error occurs on a cache cycle.

The tag control circuit 314 controls a replacement algorithm to select which of the four cache data RAM ways 330, 332, 334 and 336 is replaced when a line is updated. One replacement algorithm is a least recently used (LRU) algorithm, in which the cache SRAM control circuit 312 monitors accesses of each cache line of L2 cache 190, determines the order of accesses and classifies this order. The way that is classified as being accessed least recently is selected for replacement.

A related replacement algorithm is a pseudo-least recently used (pseudo-LRU) method, which utilizes three bits per cache line to monitor cache accesses. A first bit is used to monitor accesses to the upper half ways 334 and 336 with respect to the lower half ways 330 and 332. The first bit is asserted, for example, when the most recent access strikes the upper half ways 334 and 336. The first bit is deasserted when the most recent access strikes the lower half ways 330 and 332. A second bit is included to monitor accesses to the upper quarter way 336 with respect to the third quarter way 334. The second bit is asserted when an access strikes the upper quarter way 336 and is deasserted when an access strikes the third quarter way 334. The second bit is updated only when the first bit is asserted. A third bit is included to monitor accesses to the lower quarter way 330 with respect to the second quarter way 332. The third bit is asserted when an access strikes the second quarter way 332 and is deasserted when an access strikes the lower quarter way 330. The third bit is updated only when the first bit is asserted.

An alternative replacement algorithm is a random replacement technique in which the way to be replaced is randomly selected.

A further alternative replacement algorithm is a not last used (NLU) method which utilizes a pointer that points to the most recently used way. The pointer stores a copy of the number of the way that was last accessed for any particular set address. The concept of the NLU method is that random selection is generally suitable but is improved by avoiding random selection of the last-used way for a set address since that way is the most likely way to be accessed.

The efficiency and performance of a cache utilizing different cache policies typically is highly dependent on the software that is run. It is advantageous for various different policies to be implemented in a cache so that a maximally efficient cache policy is selected for running a particular software routine. It is additionally advantageous for the cache to automatically select a maximally advantageous cache policy during the execution of various software routines.

The cache decode circuit 316 is connected to the microprocessor 100 via extended address lines ADD(31:0), byte enable lines and control lines. The cache decode circuit 316 accesses memory address signals, data, byte enable signals and miscellaneous control signals for the L2 cache 190 at a rising edge of the clock which drives microprocessor timing. The cache decode circuit 316 determines the type of cache cycle that is driving the caches. The basic cache cycles include cache read hit, cache read miss, tag read and memory read cycles. In a cache read miss cycle, the microprocessor requests caching of a particular line in main memory 101 that is not currently in the cache. For example in the cache read miss cycle, the cache decode circuit 316 sends a signal to the SRAM data and code memory 310 via the cache SRAM control circuit 312 and sends a signal to the tag control circuit 314 to control storing of data from the main memory 101 into the SRAM data and code memory 310. The tag control circuit 314 responds to the cache read miss signal by initiating timing cycles, generating write enable signals, tag select signals and chip enable signals, controlling transmission of these signals to the SRAM data and code memory 310 and applying the tag portion of the address to the cache tag memory 318. The cache SRAM control circuit 312 awaits burst ready (BRDY#) signals from the microprocessor 100. With each BRDY# signal, the cache SRAM control circuit 312 writes a timing signal to the particular way that is being accessed. The way that is accessed is selected in accordance with a particular replacement algorithm that is implemented in the tag control circuit 314. The tag control circuit 314 applies control lines to the cache SRAM control circuit 312 that select the designated way upon which the cache access is directed. Thus, the same way in the SRAM data and code memory and in the cache tag memory 318 are accessed simultaneously.

In another example, the cache read hit cycle occurs as the microprocessor 100 requests a line that is cacheable but does not exist in the L2 array 190. The tag control circuit 314 responds to the cache read hit signal by simply acknowledging the read hit on the L2HIT# line to the test circuit 322. The cache SRAM control circuit 312 responds to the cache read hit signal by activating the SRAM data and code memory 310 to transfer data back to the microprocessor 100 at high speed.

The cache tag memory 318 serves as a cache directory and contains a list of the main memory addresses of the data and instruction code that is stored in corresponding locations of the SRAM data and code memory 310. Thus for each location in SRAM data and code memory 310, not only is a data or code stored in the SRAM data and code memory 310 but also an address is stored in the cache tag memory 318. The cache tag memory 318 is most basically described as a static RAM (SRAM) memory where the actual main memory address is stored. The cache tag memory 318 is addressed in a manner that is similar to page addressing in which a memory index is received that corresponds to upper address bits. Other data stored in the cache tag memory 318 includes lower address bits for a line. In one embodiment, all 32 bits of a microprocessor address are received by the tag control circuit 314 for storage in the cache tag memory 318. Least significant bits <3:0> are ignored, middle bits <13:4> are used as compare address and most significant bits <31:14> designate an address. The tag control circuit 314 compares the compare address that is applied to the L2 cache 190 to the compare address that is stored in the cache tag memory 318 that is stored at a particular address. If the compare addresses are the same, a cache hit results. The cache tag memory 318 is connected to receive control signals from the tag control circuit 314. Like the SRAM data and code memory 310, the cache tag memory 318 is readable. The L1 cache 105 similarly allows data and instruction tags to be accessed through software calls to special registers to provide for this comparison. Accordingly, both the data and code in the SRAM data and code memory 310 and the addresses in the cache tag memory 318 are readable in the manner of a block of main memory at a predetermined main memory address.

The cache tag memory 318 is a 4-way set associative cache so that each tag has three portions including a tag, an index and a block offset. The index represent a set address which selects the set of the 64K sets in the SRAM data and code memory 310. The tag is the remainder of the address generated by the processor after the set bits are removed. Tag bits of the address are compared with tag bits of the cache tag memory 318 which are stored at the same address. If the tags match, then data or code stored within the SRAM data and code memory 310 at the same address represent the contents of the main memory location that is accessed. Because the L2 cache 190 is a 4-way set-associative cache, four cache tag RAM ways 340, 342, 344 and 346 are included in the cache tag memory 318.

The back invalidation buffer and control circuit 320 is used for replacement following a cache miss. Following a cache miss, the tag control circuit 314 determines which line is to be replaced using a designated replacement algorithm. The tag control circuit 314 selects the way to be replaced and directs that data in the way to be replaced, since the data is valid data, is transferred to the back invalidation buffer and control circuit 320. At the same time, the tag control circuit 314 directs that the upper address bits of the replaced way are transferred from the cache tag memory 318 to the back invalidation buffer and control circuit 320. When the buffer in the back invalidation buffer and control circuit 320 is fall, the circuit 320 asserts a hold signal to the microprocessor 100. The microprocessor 100 subsequently returns a hold acknowledge signal, to which the back invalidation buffer and control circuit 320 responds by returning a start address to the microprocessor 100. If the line stored in the back invalidation buffer and control circuit 320 is a modified line, the microprocessor 100 performs a write operation to memory to store the line, as modified. If the line is not modified, it is simply invalidated and not written to memory. In this manner, coherency between the L1 cache 105, the L2 cache 190 and the main memory 101 is maintained.

In one embodiment, the buffer of the back invalidation buffer and control circuit 320 is only one line deep. Typically, the buffer would be several lines deep.

The test circuit 322 is connected to HIT# and HITM# pins from the microprocessor 100 to monitor hit and hit-modified status of the L1 cache 105 and to compare this status to the hit and hit-modified status of the L2 cache 190 that is detected by the tag control circuit 314. The test circuit 322 is connected to the tag control circuit 314 by L2HIT#, L2HITM# and MISS lines. Unless an error condition exists, the status of the signals on the HIT# pin and L2HIT# line are the same and the status of the signals on the HITM# pin and L2HITM# line are the same. The test circuit 322 accordingly sets signals on ERROR0 and ERROR1 lines which are connected to the microprocessor 100 or to an external analyzer, test circuit or the like. Thus, if a line is designated as modified in the L1 cache 105 and simultaneously designated as not modified in the L2 cache 190, an error condition exists because any line that is modified in the L1 cache 105 should also be modified in the L2 cache 190.

Signals on the HIT# and HITM# pins reflect results of L1 cache 105 operations that take place during a particular clock cycle, the inquire cycle, of the microprocessor. An inquire cycle is initiated by the microprocessor to determine whether a line is present in the instruction or data cache and the state of the line. An inquire cycle is driven to the microprocessor when a bus master other than the microprocessor initiates a read or write bus cycle. An inquire cycle is driven to the microprocessor when the bus master initiates a read to determine whether the data cache 150 contains the latest information. If a snooped line is in the data cache 150 in a modified state, the microprocessor has the most recent information and is to schedule a writeback of data to the main memory 101. An inquire cycle is driven to the microprocessor when the other bus master initiates a write to determine whether the microprocessor instruction cache 104 or data cache 150 contains the snooped line and to invalidate the line if the line is present.

The microprocessor sets a hit HIT# indication signal to designate the outcome of an inquire cycle. If an inquire cycle hits a valid line in either the instruction cache 104 or the data cache 150 of the L1 cache 105, the HIT# pin is asserted two clocks after an EADS# signal is sampled asserted. The EADS# signal indicates that a valid external address has been driven onto the processor address pins which are used for an inquire cycle. If the inquire cycle misses the L1 cache 105, the HIT# pin is deasserted two clocks after an EADS# signal is sampled asserted. The HIT# pin is modified only as a result of an inquire cycle and holds a value between inquire cycles.

The microprocessor sets a hit modified line HITM# indication signal to designate the outcome of an inquire cycle. The HITM# indication signal is asserted after inquire cycles that resulted in a hit to a modified line in the data cache 150 of the L1 cache 105. The HITM# bit is used to inhibit another bus master from accessing the data until the line is completely written back to the secondary (L2) cache 190.

HIT# and HITM# pins on the microprocessor integrated circuit chip are monitored to detect various errors. A first error detected is the occurrence of invalid hits to the L1 cache 105. This error is detected since if a line does not exist in the L2 cache 190 the line also cannot exist in the L1 cache 105. A second error is an incorrect modification of a line in the L1 cache 105. The second error is detected since for a line to be modified in the L1 cache 105, the line must be exclusive in the L2 cache 190. A third error is a miss to the L1 cache 105 that should be a hit. The third error is detected since, if the line is exclusive in the L2 cache 190, the line must exist in the L1 cache 105 as exclusive or modified. Table I as follows shows the hardware inclusion comparisons that create an error message:

TABLE I

| L1 | L2 | Error |
|---|---|---|
| HIT# | HIT# | — |
| HIT# | HITM# | — |
| HIT# | miss | Error |
| HITM# | HIT# | Error |
| HITM# | HITM# | — |
| HITM# | miss | Error |
| miss | HIT# | Possible Error |
| miss | HITM# | Possible Error |
| miss | miss | — |

Software routines are included for detecting additional errors. In some embodiments, cache monitoring software routines are implemented in system management mode (SMM) which is invoked using an interrupt external to the microprocessor. When a system management interrupt (SMI) is recognized, the microprocessor waits for stores to complete, waits for and asserts various timing control pins as are well known in the art, and saves the register state of the microprocessor. A software handler is then invoked which includes the cache test routines, if selected. SMM routines are typically stored in BIOS.

Convergence errors are detected by comparing data arrays in the L1 cache 105 and the L2 cache 190 to detect missed data, incorrect data or incorrect states.

One embodiment of a microprocessor includes both physical and linear tags for an L1 cache. Physical tags correspond to an absolute location of data in main memory 101. Linear tags correspond to the processor virtual address following application of a segment descriptor. The processor can change a linear address location without affecting main memory 101. The change in linear address invalidates the linear tag while the physical tag remains valid. However, if the physical address location is modified or replaced, then both the physical and linear tags are updated or invalidated, respectively. Therefore, a valid linear tag cannot exist without a valid physical tag. Software checks for this error so that errors in tags of the L1 cache 105 are tested. The cache tag memory 318 is readable as memory and allows testing of validity of L1 cache linear tags when L1 cache physical tags are valid. If physical tags, which are read from the cache tag memory 318 are valid, then linear tags are valid. An additional software routine reads the data cache and instruction cache of the L2 cache 190 to ensure that a line is not duplicated in both the data and instruction caches.

Figure 4:
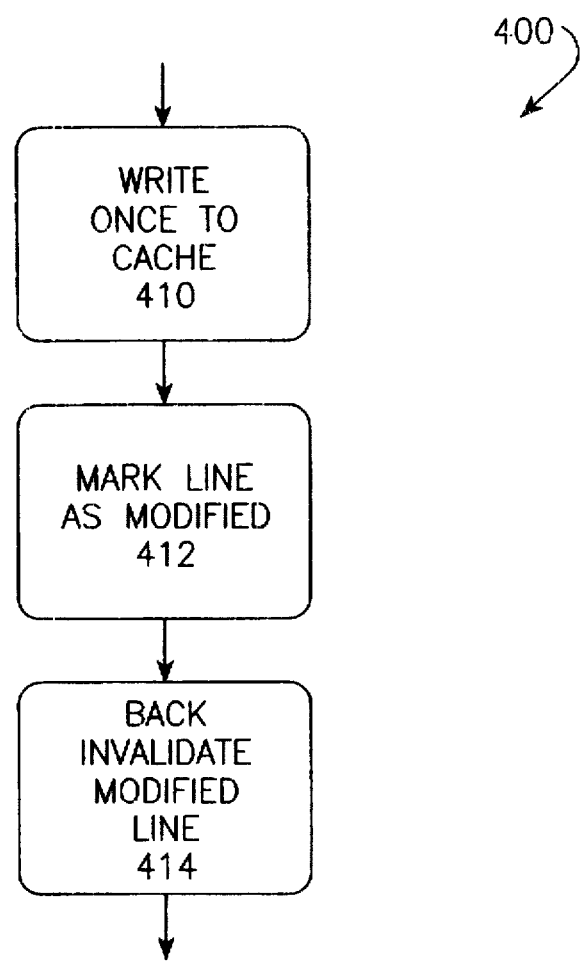
FIG. 4 is a flow chart which illustrates the operation of a first primary cache test procedure.

FIG. 4 is a flow chart which illustrates the operation of an L1 cache test procedure 400. An initial "write-once to cache" step 410, software uses a write-once protocol so that the first time data or instructions are read into both the L1 cache 105 and L2 cache 190, the data or instructions are written to main memory 101 using a write-through mode. By using the write-through mode, subsequent attempts by the processor to modify the written line in L1 or L2 cache memory necessitate that the processor go external to the main memory 101 to achieve this modification. The processor is unable to directly write to cache memory in the line that was written by a write-through operation. In a "mark line as modified" step 412, software marks the written cache line as modified in the L2 cache 190 to allow the processor to store the modified cache line into the L1 cache 105 of the processor. Thus the L2 cache 190 stores the status of the L1 cache 105 line as a modified line. Each time a line is replaced in the L2 cache 190, the replaced line is forced back into the L1 cache 105 via the back invalidation buffer and control circuit 320 in step 514. Accordingly, every time a line is replaced in the L2 cache 190, the L1 cache 105 is forced to flush that line. Thus, the contents of the L1 cache 105 are always known. No data or instructions should be present in the L1 cache 105 that is not also simultaneously in the L2 cache 190.

Figure 5:
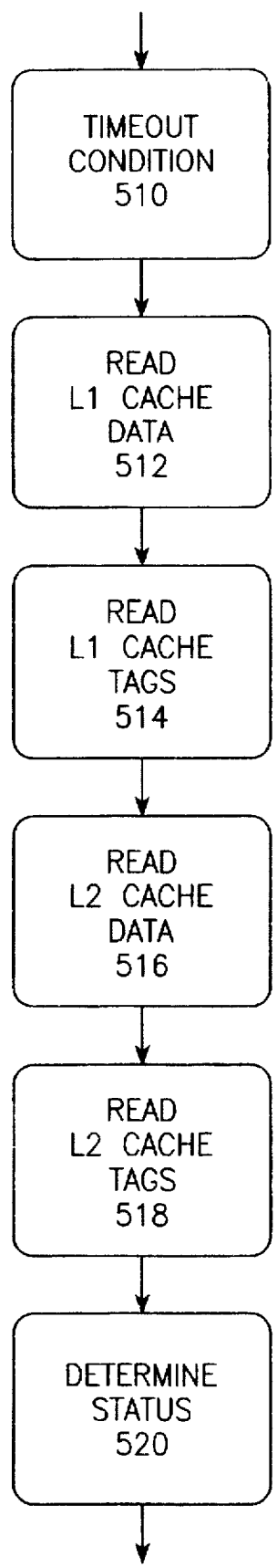
FIG. 5 is flow chart which illustrates the operation of a second primary cache test procedure.

Referring to FIG. 5, a software routine periodically probes the L1 and L2 caches to make sure that the contents are the same. In response to a timeout condition in step 510, a read L1 cache data step 512 reads data from the L1 cache using a read operation directed to a special register. In addition a read L1 cache tags step 514 reads the tag array of the L1 cache. A read L2 cache data step 516 reads data from the L2 cache and a read L2 cache tags step 518 reads the tag array of the L2 cache. A determine status step 520 determines from the accessed data and tags whether the cache line is modified, exclusive or in shared mode. The data from the L1 cache is compared to the data in the L2 cache to find where the data values are different. The locations of these differences are likely the positions at which the L1 cache failed.

Figure 6:
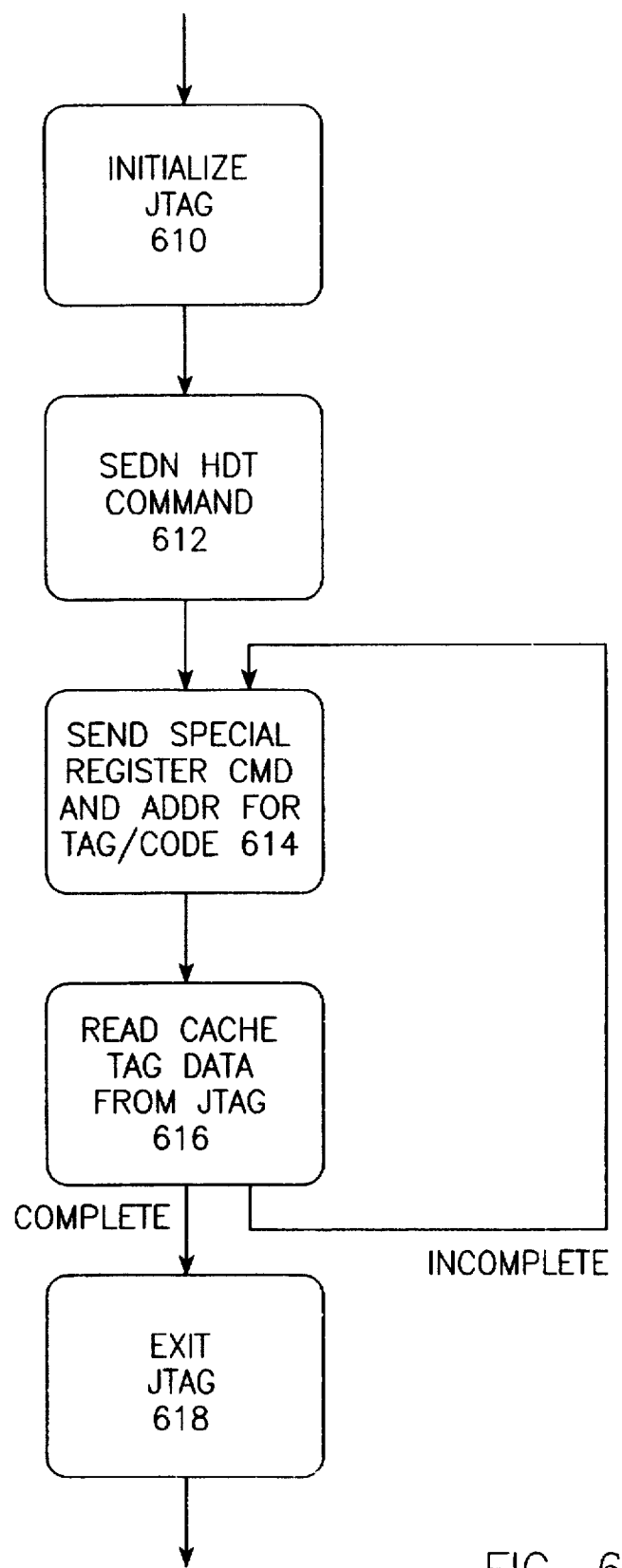
FIG. 6 is a flowchart which illustrates a software routine for reading a special JTAG register in the a cache.

Referring to FIG. 6, a flowchart illustrates a software routine for reading a special JTAG register in the a cache. An industry-standard cache controller memory address bus includes memory address bus lines, memory address bus pins and readable JTAG lines, for example JTAG|11:0|, for carrying input and output signals between memory bus and cache controller pins. In an intialize JTAG step 610, JTAG is reinitialized and clocks internal to the cache are set up. In send HDT command step 612, a hardware design tool command is sent to the cache for test purposes. In send special register command step 614, a special register read (for example, an RDMSR x86 instruction) or special register write (for example, an WRMSR x86 instruction) instruction is performed and an address for the cache tag and code is sent. In read cache and tag data step 616, cache and tag data are read from JTAG. A cache test includes a selected number of loops through the send special register command step 614 and read cache and tag data step 616. When all tests are complete, exit JTAG step 618 terminates the Jtag register reading routine.

Other Embodiments

While the invention has been described with reference to various embodiments, it will be understood that these embodiments are illustrative and that the scope of the invention is not limited to them. Many variations, modifications, additions, and improvements of the embodiments described are possible.

For example, the primary and secondary caches may be direct-mapped or fully-associative caches rather than only set-associative caches. Furthermore, the number of cache lines in the secondary cache may be greater than the number of cache lines in the primary cache.

These and other variations, modifications, additions, and improvements may fall within the scope of the invention as defined in the claims which follow.

What is claimed is:

1. A cache test circuit for testing a primary cache integrated onto a microprocessor integrated circuit, the primary cache having a primary cache control circuit for detecting cache hit, cache hit-modified, and cache miss events and generating a resulting primary cache status signal respectively including a primary cache hit signal, a primary cache hit-modified signal, and a primary cache miss event signal, the test circuit comprising:

a secondary cache substantially matching the primary cache in associativity, the secondary cache further including:

a secondary cache control circuit for detecting secondary cache hit, secondary cache hit-modified, and secondary cache miss events and generating a resulting secondary cache status signal respectively including a secondary cache hit signal, a secondary cache hit-modified signal, and a secondary cache miss event signal;

a secondary cache test circuit coupled to the secondary cache control circuit and coupled to the primary cache control circuit for comparing the primary cache status signal from the primary cache control circuit and the secondary cache status signal and for generating an error signal in response to a comparison result; and a back invalidation buffer and control circuit for maintaining data coherence between the primary cache and the secondary cache.

2. A test circuit according to claim 1, further comprising:

a memory coupled to a microprocessor of the microprocessor integrated circuit, the memory including software instructions for suspending cache operations on receipt of the error signal from the secondary cache test circuit; wherein during suspension of cache operations, the software instructions verify a state and data in the primary cache against a state and data within the secondary cache.

3. A test circuit according to claim 1, further comprising:

a memory coupled to a microprocessor of the microprocessor integrated circuit, the memory including software instructions for periodically suspending cache operations for cache operation monitoring; wherein during suspension of cache operations, the software instructions verify a state and data of the primary cache against a state and data within the secondary cache.

4. A test circuit according to claim 1, further comprising:

a memory coupled to a microprocessor of the microprocessor integrated circuit, the memory including software instructions for:

writing to a main memory through the primary and the secondary caches using a write-once protocol in a write-through mode;

marking a cache line in the secondary cache as modified to allow the microprocessor to store a modified cache line to main memory; and when a line is replaced in the secondary cache in response to a replacement operation of the primary cache, forcing the replaced line into the primary cache.

5. A test circuit according to claim 1, further comprising:

a memory coupled to a microprocessor of the microprocessor integrated circuit, the memory storing a computable readable code embodied therein including software instructions for:

periodically monitoring the primary and secondary caches;

in response to the periodically monitoring step, reading primary cache tags from the primary cache;

reading secondary cache tags from the secondary cache;

reading secondary cache data from the secondary cache; and determining from the primary cache tags, the primary cache data, the secondary cache tags and the secondary cache data whether a cache line is modified, exclusive or in shared mode.

6. A computer program product comprising:

a computer usable medium storing the computable readable code including the software instructions according to claim 5.

7. A test circuit according to claim 1, wherein the line size of the secondary cache is equal to the line size of the primary cache.

8. A test circuit according to claim 1 further comprising:

a secondary cache memory coupled to the secondary cache control circuit, the secondary cache memory including a plurality of ways so that the secondary cache is a multiple-way set-associative cache; and a secondary cache tag memory including a plurality of ways equal to the number of ways of the secondary cache memory, the primary cache being a multiple-way set-associative cache having a plurality of ways equal to the number of ways of the secondary cache memory.

9. A secondary cache for testing a primary cache integrated onto a microprocessor integrated circuit, the primary cache having a primary cache control circuit for detecting cache hit, cache hit-modified and cache miss events and generating a resulting primary cache status signal respectively including a primary cache hit signal, a primary cache hit-modified signal, and a primary cache miss event signal, the secondary cache comprising:

a cache decode circuit coupled to address lines, byte enable lines and control lines of the microprocessor integrated circuit;

a cache SRAM control circuit coupled to the cache decode circuit;

a SRAM cache memory coupled to the cache SRAM control circuit, the SRAM cache memory having a plurality of memory elements having memory reads and writes being controlled by the cache RAM control circuit;

a cache tag control circuit coupled to the cache decode circuit, the cache tag control circuit for determining a secondary cache status including a secondary cache hit status, a secondary cache hit-modified status, and a secondary cache miss status, the cache tag control circuit also for initiating control of the secondary cache in response to the determined cache status;

a cache tag memory having a plurality of memory elements corresponding one-to-one to the memory elements of the SRAM cache memory, the cache tag memory having memory accesses controlled by the cache tag control circuit;

a back invalidation buffer coupled to the cache decode circuit and the cache tag control circuit, and coupled to the microprocessor integrated circuit via the address lines; and a test circuit coupled to a plurality of primary cache status lines of the microprocessor integrated circuit and coupled to the cache tag control circuit to receive the secondary cache status, the test circuit for comparing a primary cache status from the plurality of primary cache status lines to the secondary cache status and generating an error signal when the primary cache status differs from the secondary cache status.

10. A secondary cache according to claim 9 wherein:

the SRAM cache memory includes a plurality of ways so that the secondary cache is a multiple-way set-associative cache; and the cache tag memory includes a plurality of ways equal to the number of ways of the SRAM cache memory, the primary cache being a multiple-way set-associative cache having a plurality of ways equal to the number of ways of the SRAM cache memory.

11. A cache test circuit for testing a primary cache integrated onto a microprocessor integrated circuit, the primary cache having a primary cache control circuit for detecting primary cache events of a plurality of types and generating a primary cache status signal as a function of the detected primary cache events, the cache test circuit comprising:

a secondary cache substantially matching the primary cache in associativity, the secondary cache further including:

a secondary cache control circuit for detecting secondary cache events of a plurality of types and generating a secondary cache status signal as a function of the detected secondary cache events; and a secondary cache test circuit coupled to the secondary cache control circuit and coupled to the primary cache control circuit for comparing the primary cache status signal to the secondary cache status signal, and for generating an error signal in response to a is defined comparison result.

12. A test circuit according to claim 11, further comprising:
a back invalidation buffer and control circuit for maintaining data coherence between the primary cache and the secondary cache.

13. A test circuit according to claim 11, further comprising:
a memory coupled to a microprocessor of the microprocessor integrated circuit, the memory including software instructions for suspending cache operations on receipt of the error signal from the test circuit; wherein
during suspension of cache operations, the software instructions verify a state and data in the primary cache against a state and data within the secondary cache.

14. A test circuit according to claim 11, further comprising:
a memory coupled to a microprocessor of the microprocessor integrated circuit, the memory storing a computable readable code embodied therein including software instructions for periodically suspending cache operations for cache operation monitoring; wherein
during suspension of cache operations, the software instructions verify a state and data in the primary cache against a state and data within the secondary cache.

15. A test circuit according to claim 11, further comprising:
a memory coupled to a microprocessor of the microprocessor integrated circuit, the memory storing a computable readable code embodied therein including software instructions for:
writing to a main memory through the primary and the secondary caches using a write-once protocol in a write-through mode;
marking a cache line in the secondary cache as modified to allow the microprocessor to store a modified cache line to main memory; and
when a line is replaced in the secondary cache in response to a replacement operation of the primary cache, forcing the replaced line into the primary cache.

16. A computer program product comprising:
a computer usable medium storing the computable readable code including the software instructions according to claim 15.

17. A test circuit according to claim 11, further comprising:
a memory coupled to a microprocessor of the microprocessor integrated circuit, the memory storing a computable readable code embodied therein including software instructions for:
periodically monitoring the primary and secondary caches;
in response to the periodically monitoring step, reading primary cache tags from the primary cache;
reading secondary cache tags from the secondary cache;
reading secondary cache data from the secondary cache; and
determining from the primary cache tags, the primary cache data, the secondary cache tags and the secondary cache data whether a cache line is modified, exclusive or in shared mode.

18. A computer program product comprising:
a computer usable medium storing the computable readable code including the software instructions according to claim 17.

19. A test circuit according to claim 11, wherein the line size of the secondary cache is equal to the line size of the primary cache.

20. A test circuit according to claim 11 further comprising:
a secondary cache memory coupled to the secondary cache control circuit, the secondary cache memory including a plurality of ways so that the secondary cache is a multiple-way set-associative cache; and
a secondary cache tag memory including a plurality of ways equal to the number of ways of the secondary cache memory, the primary cache being a multiple-way set-associative cache having a plurality of ways equal to the number of ways of the secondary cache memory.

* * * * *